(12) United States Patent
Engler et al.

(10) Patent No.: US 8,289,575 B2
(45) Date of Patent: Oct. 16, 2012

(54) METHOD AND PRINTING TECHNOLOGY MACHINE FOR CONVERSION OF COLOR MEASURED VALUES MEASURED WITHOUT A FILTER INTO COLOR MEASURED VALUES MEASURED WITH A FILTER AND VICE VERSA

(75) Inventors: Hans Engler, Dossenheim (DE);
Werner Huber, Wiesloch (DE); Birgit Plautz, Winnenden (DE); Manfred Schneider, Bad Rappenau (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 480 days.

(21) Appl. No.: 12/702,586

(22) Filed: Feb. 9, 2010

(65) Prior Publication Data
US 2010/0202002 A1 Aug. 12, 2010

(30) Foreign Application Priority Data
Feb. 9, 2009 (DE) .......................... 10 2009 008 111

(51) Int. Cl.
*H04N 1/60* (2006.01)
*G01N 21/00* (2006.01)

(52) U.S. Cl. ......... 358/1.9; 358/504; 358/518; 250/372; 356/51; 356/928

(58) Field of Classification Search .................. 358/500, 358/501, 504, 518–524, 530, 505, 512, 1.9; 250/372; 382/162; 356/51, 402, 407, 432, 356/433, 928, 416
See application file for complete search history.

(56) References Cited

U.S. PATENT DOCUMENTS

| | | | |
|---|---|---|---|
| 7,466,417 B2 * | 12/2008 | Ehbets et al. | 356/402 |
| 7,515,267 B2 * | 4/2009 | Ehbets et al. | 356/416 |
| 7,551,317 B2 | 6/2009 | Engler et al. | |
| 7,808,676 B2 | 10/2010 | Huber et al. | |
| 7,847,264 B2 * | 12/2010 | Wegmuller et al. | 250/372 |
| 8,085,434 B2 * | 12/2011 | Bala et al. | 358/518 |
| 2007/0260413 A1 | 11/2007 | Ehbets et al. | |
| 2008/0308740 A1 | 12/2008 | Wegmuller et al. | |

FOREIGN PATENT DOCUMENTS

DE 37 07 027 A1 9/1988
(Continued)

OTHER PUBLICATIONS

German Patent and Trademark Office Search Report, dated Oct. 20, 2009.

*Primary Examiner* — Scott A Rogers
(74) *Attorney, Agent, or Firm* — Laurence A. Greenberg; Werner H. Stemer; Ralph E. Locher

(57) ABSTRACT

A method for controlling color in printing technology machines, includes measuring color measured values without/with a UV filter and converting them with a computer to color measured values measured with/without a UV filter. The color measured values measured without/with a UV filter are recorded by a color measurement instrument on a substrate. The spectral remission values of the substrate measured with and without a UV filter are supplied to the computer and the computer converts color measured values measured without/with a UV filter to color measured values measured with/without a UV filter taking into account these supplied spectral remission values of the substrate, and uses them to control the color in the printing technology machine. A printing technology machine having a computer for carrying out the method, is also provided.

7 Claims, 3 Drawing Sheets

FOREIGN PATENT DOCUMENTS

| | | |
|---|---|---|
| DE | 102 57 981 A1 | 7/2003 |
| DE | 10 2004 021 599 A1 | 12/2005 |
| DE | 10 2007 008 850 A1 | 11/2007 |
| EP | 2 003 431 A1 | 12/2008 |
| WO | 2006/045620 A1 | 5/2006 |

* cited by examiner

METHOD AND PRINTING TECHNOLOGY MACHINE FOR CONVERSION OF COLOR MEASURED VALUES MEASURED WITHOUT A FILTER INTO COLOR MEASURED VALUES MEASURED WITH A FILTER AND VICE VERSA

CROSS-REFERENCE TO RELATED APPLICATION

This application claims the priority, under 35 U.S.C. §119, of German Patent Application DE 10 2009 008 111.9, filed Feb. 9, 2009; the prior application is herewith incorporated by reference in its entirety.

BACKGROUND OF THE INVENTION

1. Field of the Invention

The present invention relates to a method and a printing technology machine for controlling the color in printing technology machines, wherein color measured values are measured without a UV filter and are converted through the use of a computer to color measured values measured with a UV filter, and vice versa, and wherein the color measured values measured without/with a UV filter can be recorded through the use of a color measurement instrument on a substrate.

During the production of printed products, the print quality must be continually checked during production. In order to do that, sample sheets are taken from the printing machine at least at specific time intervals, and are measured through the use of a color measurement instrument. The color measured values recorded in that way are then compared with the original. If any intolerable discrepancies occur during that process, then the color in the printing machine must be changed in such a way that the substrates that are produced are once again as close as possible to the original. So-called optical brighteners are very widely used in modern substrates. However, those optical brighteners influence the color impression since they convert the UV components of the illuminating light to visible light in the short-wave range. Visually, the substrate thereby appears to be slightly bluish, and therefore whiter. However, that influences the overall color impression. When color measurements are then carried out for quality control purposes through the use of a color measurement instrument on substrates such as those with brighteners, the measurement result is significantly dependent on the UV component of the illuminating light, and the effect of the optical brightener. All color measurement instruments which operate without a UV filter have a significant UV component in the illuminating light, as a result of which that problem occurs widely with color measurement instruments. A further problem results from the fact that the UV components in the illuminating light may fluctuate. In consequence, the measured values vary in a corresponding manner, which in turn adversely affects the comparability of measurements which have been carried out using different color measurement instruments and different UV components. Particularly major discrepancies occur when one measurement instrument is equipped with a UV filter while the other operates without a UV filter. In order to make measurements such as those comparable, the color measured values recorded without a UV filter and those recorded with a UV filter must, however, be made comparable in some way. In this application, a UV filter means a UV filter which suppresses the UV component and allows only the spectrum of the light outside the UV spectrum to pass. UV filters such as those are also referred to as UV cut filters, and those two expressions are used synonymously in the instant application.

SUMMARY OF THE INVENTION

It is accordingly an object of the invention to provide a method and a printing technology machine for conversion of color measured values measured without a filter into color measured values measured with a filter and vice versa, which overcome the hereinafore-mentioned disadvantages of the heretofore-known methods and machines of this general type and which convert color measured values measured without a spectral filter into color measured values measured with a spectral filter, and vice versa and thus make them comparable.

With the foregoing and other objects in view there is provided, in accordance with the invention, a method for controlling color in printing technology machines. The method comprises measuring color measured values without/with a UV filter and converting the color measured values with a computer into color measured values measured with/without a UV filter, recording the color measured values measured without/with a UV filter with a color measurement instrument on a substrate, supplying spectral remission values of the substrate measured with and without a UV filter to the computer, and converting color measured values measured without/with a UV filter to color measured values measured with/without a UV filter in the computer while taking the supplied spectral remission values of the substrate into account and using them to control the color in the printing technology machine.

In the case of the method according to the invention, color measured values are measured without a spectral filter and are converted in a computer to color measured values measured with a spectral filter, and vice versa, in order to create comparability between the color measured values measured in various ways. The color measured values measured without/with a spectral filter are recorded through the use of a color measurement instrument on the substrate, whereas the complementary color measured values are simply calculated. In order to allow this conversion to be carried out, the spectral remission values of the substrate are measured on one hand with and on the other hand without a spectral filter and are supplied to a computer, as a result of which the computer can convert color measured values measured without a spectral filter to color measured values measured with a spectral filter, and vice versa, taking into account these supplied spectral remission values of the substrate, and can use them to control the color in a printing machine.

First of all, this type of conversion is independent of the wavelength of the spectrum, and can be used for different spectral filters. However, since the UV component must primarily be taken into account with respect to the paper white, the spectral filter is preferably a UV filter, as a result of which color measured values recorded with a color measurement instrument without a UV filter are converted to color measured values measured with a UV filter, and vice versa.

In accordance with another mode of the invention, the computer is supplied with the spectral remission of the colors on the substrate measured without/with a spectral filter. A correction factor which in each case describes the intensity of the contribution of the optical brightener to the respective remission spectrum of the respective color can be determined empirically, in particular, on the basis of the spectral remission of the four primary colors cyan, yellow, magenta and black. This correction factor is therefore determined for each of the four primary colors.

In accordance with a further mode of the invention, the spectral influence of optical brightener in the substrate is determined in the computer. For this purpose, the difference from the white spectrum of the substrate is formed on one hand without a UV filter and on the other hand with a UV filter. The already mentioned correction factor can then be determined through the use of the spectral influence, determined in this way, of the optical brightener in the substrate.

In accordance with an added mode of the invention, the correction factors are recorded by recording color measured values on a plurality of substrates that have been produced. In order to empirically determine the correction factors for the primary colors, a plurality of printed sheets, for example 14 printed sheets, are measured which have been printed by using two different color series on seven different substrates. Here, in each case one full-tone field and a 50% matrix field are measured for each of the four primary colors, on one hand with a UV filter and on the other hand without a UV filter. The color measured values recorded in this way with a UV filter are converted to color measured values recorded without a UV filter using the already described method, and vice versa, and are compared with the measured values. An optimization method is then used to determine a correction factor, in order to approximate the calculated values to the measured values.

With the objects of the invention in view, there is concomitantly provided a printing machine, comprising a computer for carrying out the steps of the method according to the invention.

Other features which are considered as characteristic for the invention are set forth in the appended claims.

Although the invention is illustrated and described herein as embodied in a method and a printing technology machine for conversion of color measured values measured without a filter into color measured values measured with a filter and vice versa, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The following detailed description of the invention makes reference to the figures of the drawings as a whole:

1. Conversion of Color Measured Values Measured with a Filter to Color Measured Values Measured without a Filter
   a) Determination of the Remission Component of the Color without the Substrate Influence In a first step, the pure remission component of the color without the substrate influence is determined. Since the glazing printed color acts like a color filter on the substrate, the influence of the substrate can be calculated by division by the substrate spectrum. This results in the N-dimensional remission vector which describes the remission characteristic of the pure color layer.

$$\beta_F(\lambda_i) = \beta_{F\ with\ UVcut}(\lambda_i) / \beta_{PW\ with\ UVcut}(\lambda_i)$$

Figure 1:
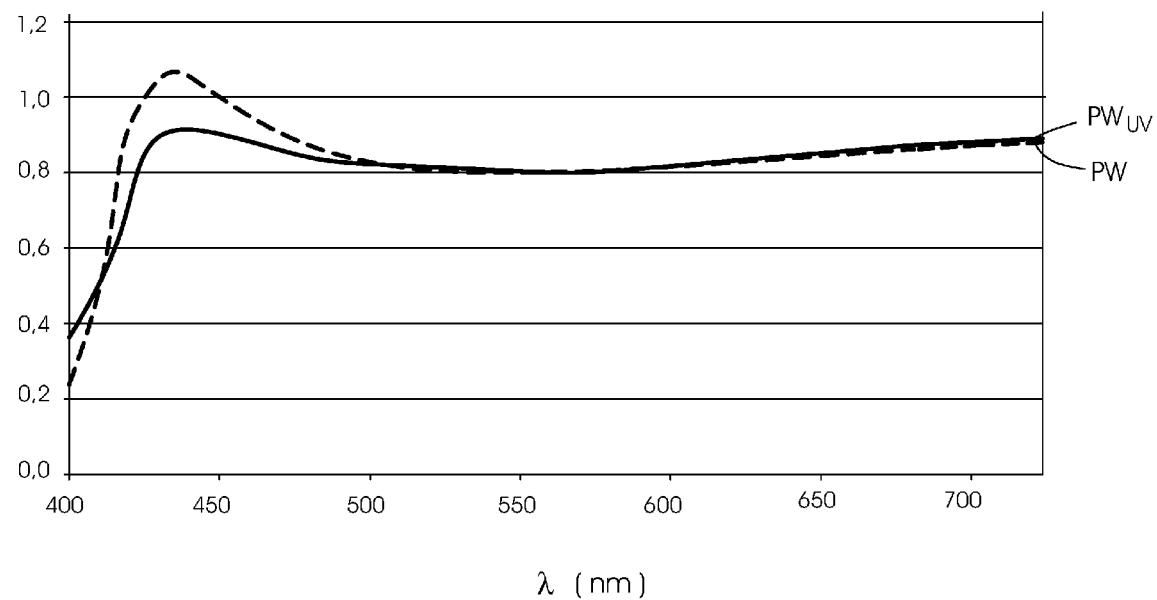
FIG. 1 is a graph showing, by way of example, a spectrum of a white substrate measured on one hand with a UV filter and on the other hand without a UV filter.

$\beta_F(\lambda_i)$ Remission level of the pure color layer independently of the substrate influence and independently of whether a filter has or has not been used $\beta_F$ with UVcut$(\lambda_i)$ Remission level of the color on the substrate measured with a UV filter $\beta_{PW}$ with UVcut$(\lambda_i)$ Remission level of the substrate measured with a UV filter b) Determination of the Spectral Influence of the Optical Brightener in the Substrate The maximum emission component of the optical brightener is now determined by forming the difference between the substrate/white spectrum in FIG. 1 without a UV filter and the substrate/white spectrum with a UV filter.

$$\gamma_{optical\ brightener}(\lambda_i) = \beta_{PW}\ without\ UVcut(\lambda_i) - \beta_{PW}\ with\ UVcut(\lambda_i)$$

$\gamma_{optical\ brightener}(\lambda_i)$ Pure emission level of the optical brightener in the i-th wavelength interval $\beta_{PW}$ without UVcut$(\lambda_i)$ Remission level of the substrate without a UVcut filter, measured in the i-th wavelength interval $\beta_{PW}$ with UVcut$(\lambda_i)$ Remission level of the substrate with a UVcut filter, measured in the i-th wavelength interval The contribution $\gamma_{optical\ brightener}(\lambda_i)$ is required to determine the correction factor in the next step.

c) Determine Correction Value

The correction value is based on the consideration that the color impression of all printed surfaces is influenced by the contribution of the optical brightener. This contribution is dependent on the excitation level of the optical brightener. Mathematically speaking, this means that the emission component of the optical brightener in the measured remission spectra of the colors is weighted with a factor. This is dependent on the absorption characteristics of the colors in the short-wave range.

The contribution of the optical brightener in the measured remission spectrum varies as a function of the absorption of a color in the short-wave range. There are two reasons for this: on one hand, the transparency of a color in the non-visible short-wave range below about 400 nm governs the excitation level of the optical brightener. On the other hand, the emission radiation produced by the optical brighteners in the short-wave visible range between about 400 nm and 470 nm is once again partially absorbed by the color.

In order to provide for correct recording of the processes, it would be advantageous to know the spectral profile of the colors in the abovementioned wavelength ranges. However, the range below 400 nm can only be inadequately recorded, or not at all, by the color measurement instruments used in the printing industry. It is therefore necessary to estimate the spectral profiles in the short-wave visible range. One or more reliably measured remission values in the wavelength range around 420 nm are used for this purpose. The remission in the wavelength interval 420-430 nm is preferably used. Since this value is different for each printed color, the expression color-dependent factor is used. This describes the response of the real printed color series on the real substrate. This therefore results in an accuracy improvement, and is referred to as $\beta_F(\lambda_{i=j})$. Since a measured remission value describes the behavior of the light passing through the color layer twice, the square root of this remission value must be used, on the basis of the color filter theory, for the conversion process, in order to obtain a measure for the transmissivity of the color in this range.

Figure 2:
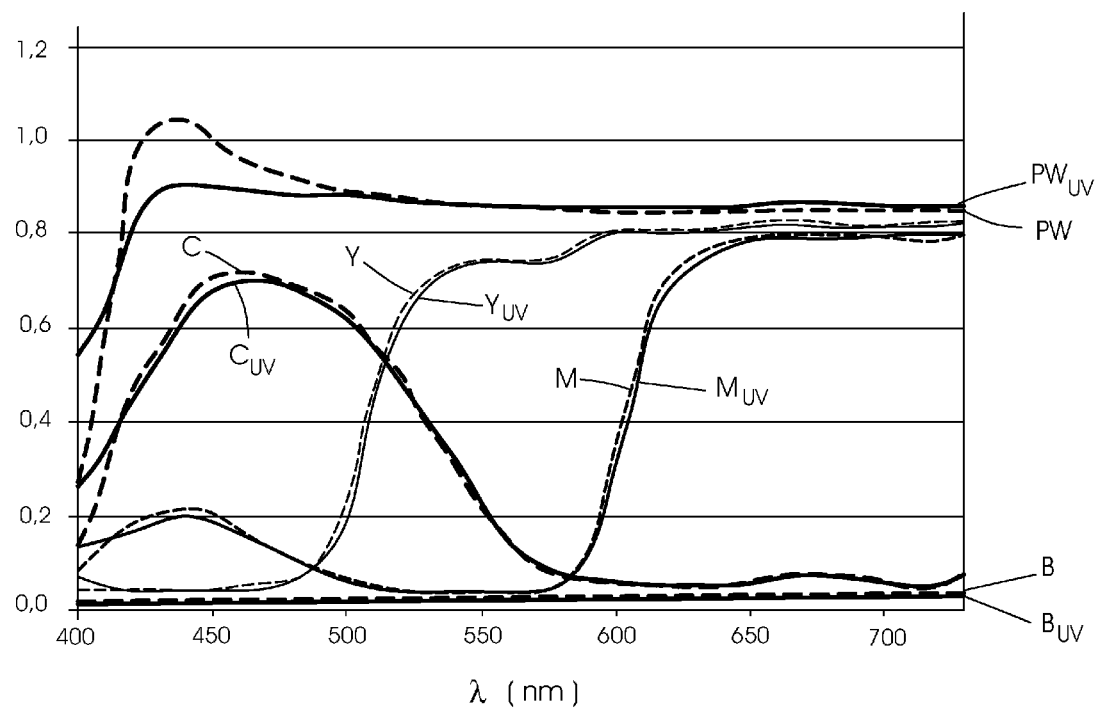
FIG. 2 is a graph showing full-tone spectra of the four primary colors, measured with and without a UV filter.

In addition, an empirically determined correction factor $b_F$ must be introduced, which has been determined for each of the four primary printed colors CMYK in FIG. 2. This describes the intensity of the contribution of the optical brightener to the remission spectrum of the colors.

In order to determine the influence of the optical brightener in a color spectrum measured without a UVcut filter, this therefore results in the following correction term:

$$\beta_{Correction}(\lambda_i) = \gamma_{optical\ brightener}(\lambda_i) * b_F * \sqrt{\beta_F(\lambda_{i=j})}$$

$\beta_{Correction}(\lambda_i)$ Remission correction vector in the i-th wavelength interval $\beta_F(\lambda_j)$ Relative remission of the color in the wavelength interval j, in this case, preferably, $\lambda_{i=j=420\ nm}$ $b_F$ Empirically determined correction factors, as a function of the transmissivity of the respective color series in the range from 320-420 nm.
F∈{K, C, M, Y}
$b_K = 1.4$
$b_C = 0.8$
$b_M = 1.3$
$b_Y = 1.4$ The empirical determination of $b_F$ will be described further below.

d) Determine Remission Spectra of the Colors without a UV Filter

Figure 3:
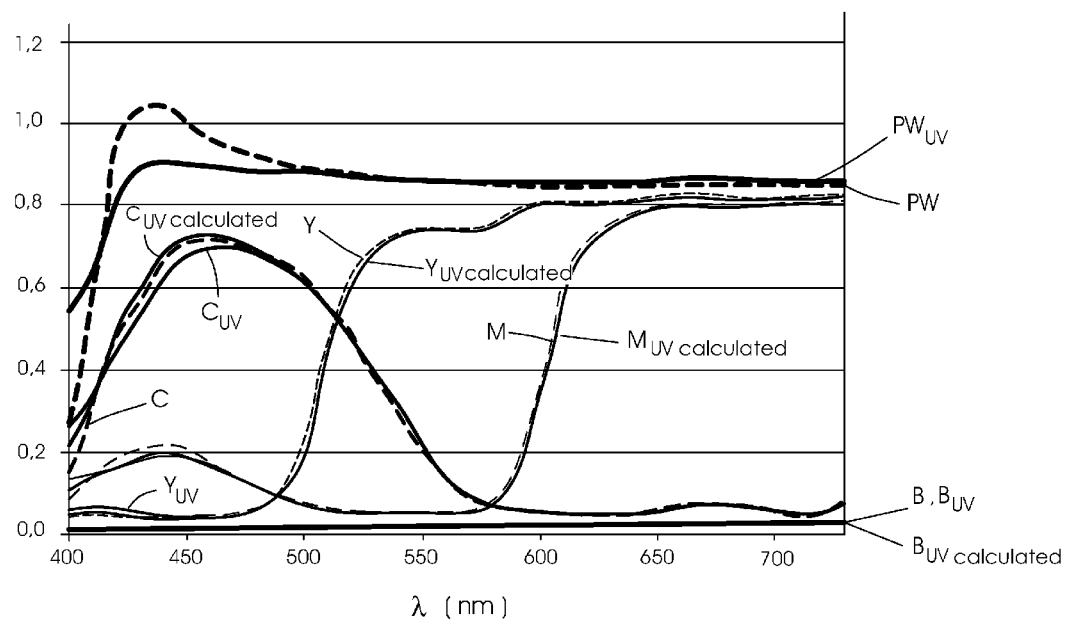
FIG. 3 is a graph showing a comparison between the full-tone spectra measured with a UV filter and the full-tone spectra calculated with a UV filter, additionally showing the full-tone spectra measured without a UV filter.

In the final step, the sum of the determined correction vector $\beta_{correction}(\lambda_i)$ and the spectrum of the substrate with a UV filter is multiplied by the spectrum of the pure color layer. The following term calculates a spectrum which is very similar to a measured corresponding spectrum without a UV filter, see FIG. 3:

$$\beta_F\ without\ UVcut(\lambda_i) = \beta_F(\lambda_i) * (\beta_{PW}\ with\ UVcut(\lambda_i) + \beta_{Correction}(\lambda_i))$$

The above statements apply only to consideration of primary color full tones. An extension to any desired matrix compositions will be described in the following text.

Variants

1. Variants are possible with modified correction factors in the shortened wavelength range [400 . . . 700 nm] or with broader wavelength intervals (20 nm).
2. If the intention is not to convert the pure primary colors CMYK to the new filter setting, but colors based on dot-matrix printing or over printing, the correction factors $b_F$ are calculated on the basis of the proportion of the area coverages.

$$b_F = \frac{\left(\frac{FD_K}{100} \cdot b_K\right) + \left(\frac{FD_C}{100} \cdot b_C\right) + \left(\frac{FD_M}{100} \cdot b_M\right) + \left(\frac{FD_Y}{100} \cdot b_Y\right)}{(FD_K + FD_C + FD_M + FD_Y)/100}$$

$FD_K$ . . . Area coverage black [%]
$FD_C$ . . . Area coverage cyan [%]
$FD_M$ . . . Area coverage magenta [%]
$FD_Y$ . . . Area coverage yellow [%]

Empirical Determination of the Correction Factors $b_F$:

By way of example, 14 different printed sheets are measured for empirical determination of the correction factors $b_F$, printed with two different color series on seven different substrates. In each case one full-tone field and one 50% matrix field are measured with and without a UV filter for each of the four primary colors CMYK.

The values recorded with a UV filter have been converted to values measured without a UV filter, and have been compared with the measured values, using the above method. The correction factor for an average, minimal delta E over all the samples is determined through the use of an optimization method. In order to do this, the respective pseudo-UV spectra are calculated by variation of $b_F$, the colorimetric lab values are determined from this, and these are compared with the lab values of the corresponding spectra actually measured with a UV filter.

2. Conversion of Color Measured Values Measured without a Filter to Color Measured Values Measured with a Filter a) Determination of the Spectral Influence of the Optical Brightener in the Substrate First of all, the maximum emission component of the optical brightener is determined by forming the difference between the substrate spectrum without a UV filter and the substrate spectrum with a UV filter.

$$\gamma_{optical\ brightener}(\lambda_i) = \beta_{PW}\ without\ UVcut(\lambda_i) - \beta_{PW}\ with\ UVcut(\lambda_i)$$

$\gamma_{optical\ brightener}(\lambda_i)$ Pure emission level of the optical brightener in the i-th remission interval $\beta_{PW}$ without UVcut($\lambda_i$) Remission level of the substrate measured without a UV filter, in the i-th remission interval $\beta_{PW}$ with UVcut($\lambda_j$) Remission level of the substrate measured with a UV filter, in the i-th remission interval This element is required to determine the correction factor in the next step.

b) Determination of the Correction Value

The following correction term is therefore obtained in order to determine the influence of the optical brightener in a color spectrum measured without a UV filter:

$$\beta_{Correction}(\lambda_i) = \gamma_{optical\ brightener}(\lambda_i) * \sqrt{\beta_{FwithoutUVcut}(\lambda_{i=j})} * g_F$$

$\beta_{Correction}(\lambda_i)$ Remission correction vector in the i-th remission interval $\beta_F$ without UVcut($\lambda_j$) Relative remission of the color in the wavelength interval j, in this case preferably $\lambda_{i=j=420\ nm}$ $g_F$ Empirically determined correction factors, as a function of the transmissivity of the respective color series in the range 320-420 nm.
F∈{K, C, M, Y}
$g_K = 1.2$
$g_C = 0.7$
$g_M = 1.1$
$g_Y = 1.9$ The empirical determination of $g_F$ is described below.

c) Determination of the Remission Component of the Color without the Substrate Influence In this step, the pure remission component of the color without the substrate influence, and therefore also without the influence of the optical brightener, is determined. Since the glazing printed color acts like a color filter on the substrate, the influence of the substrate can be calculated by division by the substrate spectrum. This results in the N-dimensional remission vector, which describes the remission characteristic of the pure color layer.

$$\beta_F(\lambda_i) = \beta_F\ without\ UVcut(\lambda_i) / (\beta_{PW}\ without\ UVcut(\lambda_i) - \beta_{Correction}(\lambda_i))$$

$\beta_F(\lambda_i)$ Remission level of the pure color layer independently of the substrate influence and independently of whether a filter has or has not been used, in the i-th remission interval $\beta_F$ without UVcut($\lambda_i$) Remission level of the color on the substrate measured without a UV filter, in the i-th remission interval $\beta_{PW}$ without UVcut($\lambda_i$) Remission level of the substrate measured without a UV filter, in the i-th remission interval d) Determination of the Remission Spectra of the Colors with a UV Filter In the final step, the spectrum of the substrate with a UV filter is multiplied by the spectrum of the pure color layer. The following term calculates a spectrum which is very similar to a measured corresponding spectrum with a UV filter, see FIG. 3.

$$\beta_F \text{ with UVcut}(\lambda_i) = \beta_F(\lambda_i) * \beta_{PW} \text{ with UVcut}(\lambda_i)$$

However, the above statements apply only to a consideration of primary color full tones.

The variants mentioned in 1.) are also possible in this conversion direction, and the correction factors $g_F$ are empirically determined in the same way as the correction factors $b_F$.

The major advantage of the invention is that only the color measured values for the substrate have to be available, measured on one hand with and on the other hand without a UV filter, in each of the two conversion directions, and all the other color spectra can then be calculated. The color measured values of the substrate can also be provided by the supplier, which means that the printer does not have to carry out his or her own measurements on the substrate. The color measured values can likewise be checked in a database.

The invention claimed is:

1. A method for controlling color in printing technology machines, the method comprising the following steps:

measuring color measured values without a UV filter and converting the color measured values with a computer into color measured values measured with a UV filter;

measuring color measured values with a UV filter and converting the color measured values with a computer into color measured values measured without a UV filter;

recording the color measured values measured without/with a UV filter with a color measurement instrument on a substrate;

supplying spectral remission values of the substrate measured with and without a UV filter to the computer; and converting color measured values measured without a UV filter to color measured values measured with a UV filter, and vice versa, in the computer while taking the supplied spectral remission values of the substrate into account and using them to control the color in the printing technology machine.

2. The method according to claim 1, which further comprises supplying the computer with the spectral remission of the colors on the substrate measured without and with a UV filter.

3. The method according to claim 1, which further comprises determining a spectral influence of an optical brightener in the substrate, in the computer.

4. The method according to claim 3, which further comprises calculating a correction value on a basis of the spectral influence of the optical brightener.

5. The method according to claim 1, which further comprises using a correction factor describing an intensity of a contribution of an optical brightener in the substrate to a remission spectrum of a respective color for four primary colors cyan, magenta, yellow and black.

6. The method according to claim 5, which further comprises recording the correction factors by recording color measured values on a plurality of substrates having been produced.

7. A printing machine, comprising:

a computer for carrying out the steps of the method according to claim 1.

* * * * *